United States Patent Office 3,483,594
    Patented Dec. 16, 1969

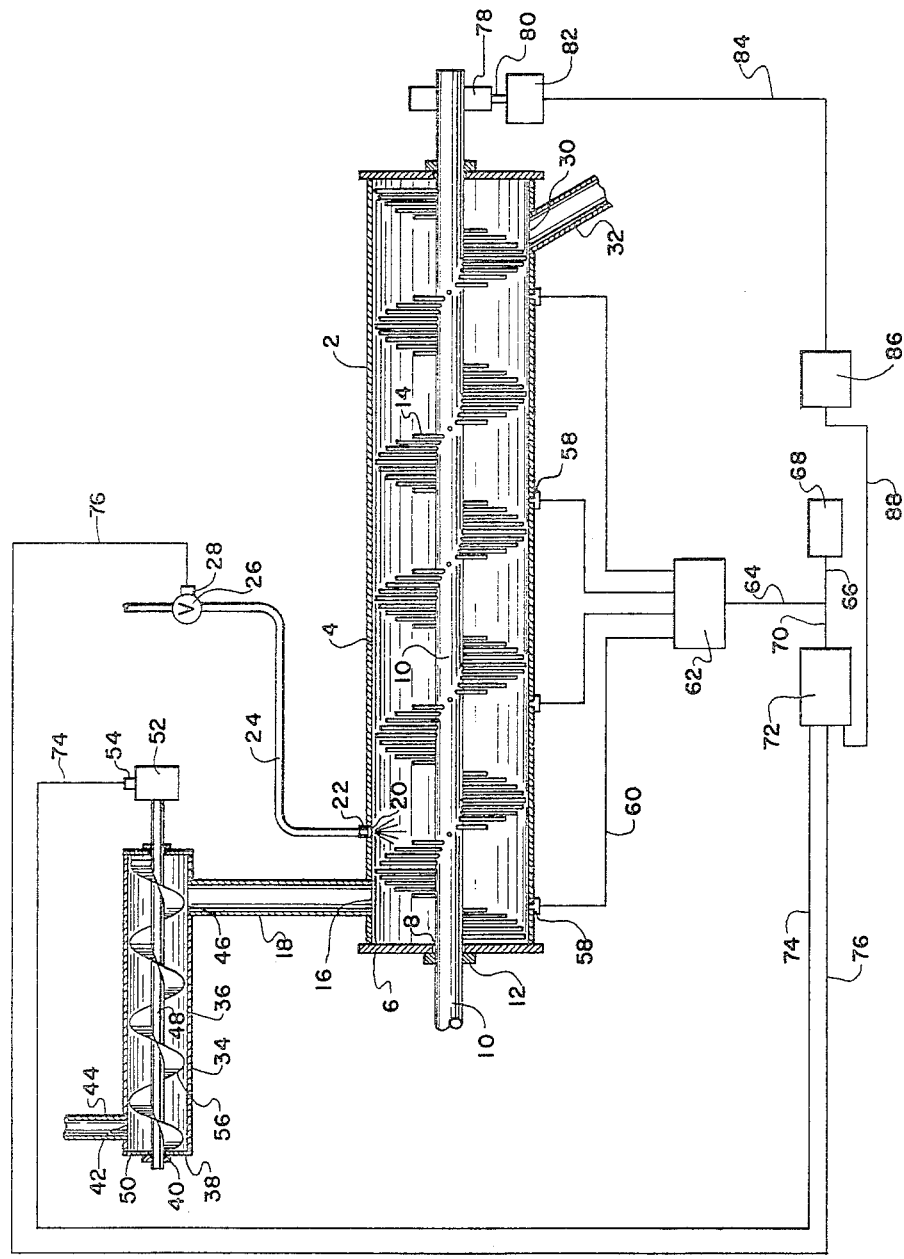

3,483,594
PELLETIZATION OF FINELY DIVIDED SOLIDS
Kenneth D. Hewitt, Houston, Tex., assignors to Continental Carbon Company, Houston, Tex., a corporation of Delaware
Filed June 15, 1967, Ser. No. 646,383
Int. Cl. B29b 1/02
U.S. Cl. 18—1                                              4 Claims

ABSTRACT OF THE DISCLOSURE

A method and apparatus for wet pelletizing finely divided solids such as carbon black in a conventional wet pelletizer to which solids and liquid are introduced with desired pelletized product being obtained by controlling the vibratory force applied to the mixture of solids and liquid during agitation. The actual vibratory force occurring during the pelletizing is compared to a standard predetermined force required for product, and the actual force is adjusted to coincide with the standard by controlling feed rates and applying supplemental vibratory force to the mixture.

BACKGROUND OF THE INVENTION

Field of the invention

The present invention relates to the pelletizing of finely divided solids and particularly carbon black in a wet pelletizing system to provide pellets of proper quality and uniformity by controlling the pelletizing conditions.

Carbon black is conventionally produced by injecting hydrocarbon feedstock, fuel gas and air into a furnace or reactor operator at elevated temperature conditions to dissociate the feedstock into carbon black which is recovered in the form of an aerosol or gas stream with the particles of carbon black suspended therein. The carbon black particles are separated from the gas stream and the finely divided particles must then be pelletized to place the black in condition for transportation and handling by the end user.

Apparatus for the manufacture of carbon black wet pellets usually comprises an elongate cylindrical pelletizing mixing box or chamber which is enclosed at both ends and provided with an axial rotatable shaft carrying a series of radially projecting pins, said cylindrical pelletizing mixing box having an inlet for water or other wetting agent, means for supplying flocculent carbon black to said cylindrical pelletizing mixing box, and means for removing the formed wet pellets therefrom, preparatory to their being dried in a rotary drying drum or equivalent drying medium.

In the wet pelletizing of finely divided solids, and particularly carbon black, considerable difficulty has been experienced in obtaining pellets of uniform size and density, and this has been attributed to a combination of factors, one of which is the difficulty in controlling the ratio of solids and pelletizing liquid, and another is the inherent tendency of the conventional mixing box to cause the pelletization of the mass to occur principally in the mid section of the mixing box with the remainder of the loose or finely divided carbon black being picked up by the previously formed pellets as they near the exit or discharge end of the wet pelletizing apparatus.

The occurrence of pelletizing is a function of the application of vibratory forces, particularly in the case of flocculent carbon black, and can possibly be explained by the fact that the finely divided solids to be pelletized normally have gases such as air, hydrocarbon and combustion gases, together with other materials such as oil and greases present on the surface of the particles which must be displaced before the liquid pelletizing medium can be effectively and intimately mixed with the solid particles for the formation of the agglomerates and pellets. In the pelletizing of carbon black, the gases absorbed on the surface of the particles as well as any residual hydrocarbons thereon must be displaced before the pelletizing water or other liquid media can effectively cause pelletization to occur, requiring that the pelletizing of carbon black occurs in only a small portion of the mixing box with the remainder of the box primarily relegated to performing the function of densifying and degasing the carbon particles.

Description of the prior art

The prior art and apparatus for wet pelletizing finely divided carbon black are basically a pelletizing apparatus described hereinabove utilized either singly or in combination to process the black to pellets. Improvements in the basic apparatus have been made in the areas of applying coatings to the equipment components, modifying two multiple shaft-agitator element arrangements, refining the agitator element shapes and deployment patterns.

The character of the finely divided solids is relatively fixed, so efforts have also been directed to modifying the pelletizing liquid, such as by adding emulsifying agents, and by utilizing additive materials in the pelletizer to control the speed of pellet formation and to alter the surface physical characteristics of the pellets.

Basically, the method of pelletizing in the practical sense has depended upon the control and judgment exercised by the operator in controlling the ratio of the solids and pelletizing liquid introduced into the pelletizer, a practice which obviously depends upon the experience and approach adopted by the individual operator in manually adjusting the inputs to the pelletizer, the speed of operating the pelletizer drive assembly, together with other adjustments to the operation made by the individual operator. Improvements have been made to attempt to eliminate the necessity of relying upon operator judgment. The solids and pelletizing liquid feeds to the apparatus are weighed with precision to maintain a desired solids-liquid ratio. The amount of work applied to the solids and liquid is controlled by measuring input from the drive asesmbly and other factors such as residence time have been monitored to introduce a degree of control into the operation. The pelletizing of carbon black still exists in the main as an art, and the prior efforts to obtain standardized methods and apparatus capable of producing pellets having a desired size, surface properties, and uniformity have not overcome the problems that exist.

SUMMARY OF THE INVENTION

The invention of the present application includes a process for the pelletizing of finely divided solids comprising introducing the solids and a pelletizing liquid into a pelletizer for agitation to form a mixture while measuring the vibratory force being applied to the mixture at a plurality of points within the pelletizer for comparison with the predetermined standard force required to effect pelletizing, controlling the vibratory force applied to the mixture within the pelletizer to maintain the standard force during the agitation and moving of the mixture through the pelletizer for removal of the mixture in pelletized form. Also encompassed by the invention is the apparatus required to effect the pelletizing comprising a closed cylindrical housing having an axial rotatable shaft with a plurality of radial pins extending therefrom and terminating adjacent the interior of said housing, a solids inlet conduit with opening and a liquid inlet opening with spray means in one end of said housing, and product outlet opening with conduit at the other end of the housing including feed means for controlling the rate of introducing said solids and liquid into the housing, a plurality of vibration sensing means carried by the housing in communication with said mixture adapted to generate a signal force, a converter means communicating the said sensing means adapted to convert said signal to an actuating force, a signal controller means communicating with said convertor means adapted to discriminately release said actuating force, and means for communicating with said controller means for actuating said feed means in response to said actuating force whereby the rate of introducing at least one of the solids and liquid is adjusted in response to said signal force, together optionally with a means for applying a supplemental vibratory force to the mixture within the pelletizer. The degree of automaticity required for the particular pelletizing operation is determinative of the precise extent to which the above components are included in the apparatus as described more fully hereinbelow.

BRIEF DESCRIPTION OF DRAWING

The single FIGURE 1 of the drawing is a diagrammatic view schematically illustrating apparatus which may be utilized to practice the method of the present invention.

DESCRIPTION OF THE PREFERRED EMBODIMENTS

Referring more particularly to the drawing, reference numeral 2 generally designates the pelletizer suitable for the wet pelletizing of carbon black comprising a cylindrical housing 4 with end plates 6 suitably affixed to form a closed cylinder, said end plates having a central aperture 8. A shaft 10 extends axially through housing 2, end plates 6 and packing glands 12, and is suitably journaled for rotation by a drive mechanism not illustrated. The shaft 10 carries one or more series of a plurality of radially projecting agitator pins 14, affixed to or through said shaft and terminating in close proximity to the interior of housing 2. The pins are preferably arranged in one or more helical patterns to move the solids and liquid through the housing and said pins may be mounted on a drum member affixed to the shaft 10.

The housing 2 is provided with an inlet opening 16, adjacent its upstream end adapted to receive a solids feed conduit 18, and there is also provided an inlet opening 20 in the housing adjacent its upstream end adapted to receive a spray nozzle 22, attached to a liquid supply line 24, having a valve 26, with a pneumatic controller 28, and extending to a liquid source not shown. A plurality of spray nozzles 22 can be inserted into housing 4 intermediate of the ends thereof, and additive spray nozzle can likewise be incorporated. Housing 2 has an outlet opening 30 adapted to receive a product outlet conduit 32 extending to a rotary dryer drum or other apparatus, not shown, for drying the pelletized product.

The solids feed conduit 18 communicates with a conveyor 34, comprising a cylindrical shell 36, having end plates 38, with a central aperture 40 and an inlet opening 42 and conduit 44 communicating with a supply of solids, not shown, together with an outlet opening 46 adapted to receive conduit 18. The conveyor 34 has a suitably journaled rotatable shaft 48 with packing glands 50 connected to a variable speed drive assembly 52, having pneumatic controller 54, said shaft mounting a helical screw member 56 for moving the solid feed into the pelletizer.

The pelletizer 2 has a series of vibration sensor devices 58, affixed to extend within the housing 4, preferably in the lower portion, in order to monitor the vibratory force being transmitted to and through the mixture within the pelletizer by the agitator pins, with the sensors being optionally extended through said housing into direct contact with said mixture. The sensors 58 are adapted to transmit a signal responsive to the vibration, such as by activation of a piezo crystal element, through lines 60 to a pneumatic converter 62 adapted to convert the signal to a pneumatic force. This pneumatic force is transmitted by lines 64 and 66 to an indicator means in the form of a direct read-out device 68, provided with a scale and indicator capable of measuring the vibratory force monitored by said sensor devices 58. The pneumatic force from converter 62 is also transmitted by line 64 and 70 to a pneumatic controller 72, adapted to discriminately relay any appropriate transmittal of the pneumatic force to the means, as described hereinbelow, for controlling the vibratory force existing within the pelletizer.

The vibratory force is applied to the mixture within the pelletizer by the shaft mounted radial pins 14 and basically is responsive to the ratio of carbon black solids and pelletizing liquid introduced into the pelletizer by conveyor 34 via conduit 8, and spray nozzle 22, via pipe 24 respectively. The amount of carbon black introduced to the pelletizer by the conveyor depends upon the operating speed of the drive assembly 52, which is determined by pneumatic controller 54 connected by line 74 to controller 72, and likewise the amount of pelletizing liquid introduced to the pelletizer by the spray nozzle depends upon the operation of valve 26 which is determined by pneumatic controller 28 connected by line 76 to controller 72. The selective transmittal of pneumatic force from controller 72, which may be a record controller, to pneumatic controllers 28 and 54 therefore applies the appropriate control to the feed means for the introduction of solids and liquid to the pelletizer.

The vibratory force applied to the mixture of the pelletizer may also be adjusted by applying supplemental vibration to the shaft for transmittal through the pins to the mixture. Specifically, a vibrating element such as a slip-ring 78 is disposed exteriorly of the pelletizer, and in telescoping relationship with respect to one end of rotatable shaft 10, through other positions may be utilized. The slip-ring 78 is connected to a transducer 80 which is in turn connected to a vibration generation means 82, which may be a mechanical vibrator or a sonic vibrator, said geneartion means 82 being connected by line 84 to an activation means such as frequency controller 86, or other suitable actuating means. The frequency controller 86 communicates by line 88 with controller 72 for discriminate activation responsive to the measured vibrational level within the solids and liquid mixture in the pelletizer.

The apparatus as described represents a fully automated apparatus arrangement, however, it is obvious that manual operation of any or all of the elements comprising valve 26, drive assembly 52 and controller 86 may be undertaken in response to the indications of read-out device 68, to reduce the degree of automaticity. It is to be understood that the teachings of the present invention also contemplate the use of electrical or other instrumentalities in lieu of the pneumatic components described herein.

The general procedure for wet pelletizing in the apparatus of the invention disclosed is to introduce carbon black in finely divided state from storage through conduit 44, to conveyor 34, to conduit 18 and into pelletizer 2 at the upstream end whereupon the black is contacted with water transmitted through pipe 24, and spray nozzle 22. The amount of water introduced for pelletizing is from about 30% to about 50% by weight of the black. The black and water are converted to a mixture by the agitation of pins 14 through the rotation of shaft 10 at a speed of from about 250 to about 400 revolutions per minute, and the continued agitation converts the mixture to pellets with the pins concurrently moving the finished pellets through the pelletizer to be discharged through outlet conduit 32 for drying as a final carbon black pelletized product.

In operation the present method of pelletization requires that the pelletizer be operated for a period of time to produce pellets with the desired characteristics of size, uniformity and physical properties utilizing the specific carbon black, pelletizing liquid, usually water, and any additives that may be required, in order to develop information as to the measurement of the standard vibratory force and frequency required to be applied to the black for proper pelletization. Upon the establishment of feed rates necessary to obtain the vibratory force required for the specific black, the controller 72 is calibrated to selectively apply such pneumatic force as is required to adjust the feed means for the black and pelletizing liquid, and the vibration generation means to compensate for the occurrence of any deviation from the standard of vibratory force to be maintained during the pelletizing operation.

The feed means are set to commence operation on the desired amounts of black and water within the throughput capacity of the pelletizer, and at the predetermined levels necessary to cause the desired vibratory force to occur and be imparted to the mixture in the pelletizer at the condition set. As the pelletizing operation is commenced, the vibratory force is monitored by the sensors 58, and the signal generated passes to the converter 62, and thence as a pneumatic force to read-out device 68 and controller 72, and so long as the vibratory and pneumatic force remains at the standard level, no adjustment is made to the operation. The controller 72 will be preset to selectively transmit a pneumatic force to one or more of the controllers 28, 54, and 86 in the event the monitored vibratory force varies from the standard. Preferably, the need for additional vibratory force of relatively minor amounts to meet the standard is accomplished by controller 72 activating controller 86, and the vibration generator 82; and, subsequent to such activation, any minor amounts of reduction in vibratory force are accomplished by deactivating said generator.

The occurrence of a deviation of an amount beyond that reasonably supplemented by said generator 82 requires an adjustment of the vibratory force to be accomplished by adjusting controllers 28 and 54 for the solids and liquid feed means. In the event the vibratory force becomes less than the standard force required, controller 72 is preferably set to initially increase the black introduced by activation of controller 54 and drive assembly 52 of conveyor 34, with subsequent upward adjustment being accomplished by further like action, reduction in the amount of liquid being introduced by activation of controller 28 and valve 26, or a combination of the same. Conversely, in the event the vibratory force exceeds the standard force required, controller 72 is preferably set to initially increase the water introduced by activation of controller 28 and valve 26, with the subsequent downward adjustment being accomplished by further like action, reduction in the amount of black being introduced by activation of controller 54 and drive assembly 52 of conveyor 34 or a combination of the same. Preferably, the controller 72 is set to activate the controller 28 or 54 that will appropriately adjust the level of the feeds of carbon black and water directionally to cause the amount of the carbon black and water mixture within the pelletizer to be brought into line with the desired throughput for the pelletizer.

The precise settings for controller 72 and the procedures established for adjusting the vibratory force applied to the mixture by subsequent activation of the controllers necessarily varies between pelletizers and depends upon the nature of the materials introduced for pelletizing, however, the preferred settings and procedures may be readily determined in view of the above description.

Having thus described the invention, what is claimed as new is:

1. An apparatus for pelletizing a mixture of finely divided solids and liquid comprising:
   a closed cylindrical housing having a rotatable shaft extending axially therethrough;
   a plurality of pins radially extending from said shaft and terminating near the interior of said housing;
   a solids inlet opening with conduit and a liquid inlet opening with spray means in one end of said housing, and a product outlet opening with conduit in the other end thereof;
   feed means for controlling the rate of introducing said solids and liquid to said housing;
   a plurality of vibration sensing means carried by said housing in communication with said mixture adapted to generate a signal force;
   a converter means communicating with said sensing means adapted to convert said signal force to an actuating force;
   a controller means communicating with said converter means adapted to discriminately relay said actuating force; and
   a means communicating with said controller means for actuating said feed means in response to said actuating force whereby the rate of introducing at least one of said solids and liquid is adjusted in response to said signal force.

2. The apparatus of claim 1 wherein said apparatus additionally comprises means for generating and imparting vibrational force to said mixture within said housing comprising:
   a vibrating element affixed to said shaft;
   a transducer means affixed to said element;
   a vibration generator means communicating with said transducer means; and
   an actuating means communicating with said generator means and said controller means for discriminate activation by said controller means.

3. An apparatus for pelletizing a mixture of finely divided solids and liquid comprising:
   a closed cylindrical housing having a rotatable shaft extending axially therethrough;
   a plurality of pins radially extending from said shaft and terminating near the interior of said housing;
   a solids inlet opening with conducit and a liquid inlet opening with spray means in one end of said housing, and a product outlet with conduit in the other end thereof;
   feed means for controlling the rate of introducing said solids and liquid to said housing;
   a plurality of vibration sensing means carried by said housing in communicaion with said mixture adapted to generate a signal force;
   a converter means communicating with said sensing means adapted to convert said signal force to an actuating force; and
   an indicator means communicating with said converter means adapted to convert said signal force to actuate a direct read-out device.

4. The apparatus of claim 3 wherein said apparatus additionally comprises means for generating and imparting vibrational force to said mixture within said housing comprising:
   a vibrating element affixed to said shaft;
   a transducer means affixed to said element;
   a vibrating generator means communicating with said transducer means; and
   an actuating means communicating with said generator means and said controller means for discriminate activation by said controller means.

References Cited

UNITED STATES PATENTS

| | | |
|---|---|---|
| 3,049,750 | 8/1962 | Austin. |
| 3,304,355 | 2/1967 | Probst et al. _____ 264—117 |
| 3,326,642 | 6/1967 | Ruble. |
| 3,333,038 | 7/1967 | Walenciak. |

WILLIAM J. STEPHENSON, Primary Examiner

U.S. Cl. X.R.

18—2